US00RE41672E

(19) United States
(12) Reissued Patent
Burrows

(10) Patent Number: US RE41,672 E
(45) Date of Reissued Patent: Sep. 14, 2010

(54) SPARK PLUG

(75) Inventor: John Anthony Burrows, Northwich (GB)

(73) Assignee: Federal-Mogul Ignition (UK) Limited, Merseyside (GB)

(21) Appl. No.: 12/401,120

(22) PCT Filed: Nov. 5, 2002

(86) PCT No.: PCT/GB02/05000

§ 371 (c)(1), (2), (4) Date: May 11, 2004

(87) PCT Pub. No.: WO03/043152

PCT Pub. Date: May 22, 2003

Related U.S. Patent Documents

Reissue of:
(64) Patent No.: 7,057,332
Issued: Jun. 6, 2006
Appl. No.: 10/495,201
Filed: May 11, 2004

(30) Foreign Application Priority Data

Nov. 13, 2001 (GB) ..... 0127218

(51) Int. Cl.
*H01T 13/20* (2006.01)

(52) U.S. Cl. ..... 313/141; 313/143

(58) Field of Classification Search ..... 313/118, 313/137, 141, 143–145
See application file for complete search history.

(56) References Cited

U.S. PATENT DOCUMENTS 4,211,952 A * 7/1980 Iwata et al. ..... 313/143
4,289,990 A 9/1981 Mayumi et al.

FOREIGN PATENT DOCUMENTS

| | | | |
|---|---|---|---|
| DE | 100 15 916 | A1 | 10/2001 |
| FR | 759 221 | A | 1/1934 |
| GB | 188 874 | A | 11/1922 |
| JP | 53126443 | A | 11/1978 |
| JP | 55071481 | U | 5/1980 |
| JP | 60153492 | U | 10/1985 |
| JP | 61029085 | A | 2/1986 |
| JP | 62217589 | A | 9/1987 |
| JP | 3055785 | A | 3/1991 |
| JP | 9-139276 | A | 5/1995 |

* cited by examiner

*Primary Examiner*—Vip Patel
(74) *Attorney, Agent, or Firm*—Robert L. Stearns; Dickinson Wright, PLLC

(57) ABSTRACT

A spark plug (30; 40) comprises an electrically-insulating sleeve (12), a first electrode (16), an electrically-conducting shell (20) surrounding said sleeve, and a second electrode (22) mounted on said shell. The electrodes (16 and 22) define a spark gap (G1) of the plug. The shell (20) has an end portion (20c) terminating at an end surface (20b) of the shell. The sleeve (12) extends past said end portion (20c) with a clearance therebetween and extends beyond said end surface (20b). The sleeve (12) has at least one projection (32) which projects from the sleeve (12) and reduces said clearance in the region of the end surface (20b), thereby forming a secondary spark gap (G2).

8 Claims, 6 Drawing Sheets

SPARK PLUG

Matter enclosed in heavy brackets [ ] appears in the original patent but forms no part of this reissue specification; matter printed in italics indicates the additions made by reissue.

This invention is concerned with a spark plug for use in providing an ignition spark to ignite the fuel of an internal combustion engine.

A typical conventional spark plug is shown in FIGS. 1A and 2A and is described in detail below. This plug comprises an electrically-insulating sleeve which extends along a central axis of the plug. Such sleeves are made of ceramic material, usually alumina. The plug also comprises a first electrode mounted within the sleeve and having a tip projecting axially beyond an end portion of the sleeve. The electrode extends centrally within the sleeve and is electrically connected to a terminal projecting from the other end of the sleeve. The connection between the terminal and the first electrode may include a resistor also contained within the sleeve which serves to control to peak current. In the operation of the plug, a high tension lead is applied to the terminal so that a high voltage can be applied to the first electrode. The plug also comprises an electrically-conducting shell surrounding said sleeve. The shell is fixed, normally by a screw thread, into the head of an engine so that the tip of the first electrode projects into the combustion chamber of a cylinder of the engine. The plug also comprises a second electrode mounted on the shell, normally by welding, and electrically-connected to the shell. The second electrode has a tip which is positioned within the combustion chamber so that a spark gap is formed between the tips of the two electrodes. The shell has a generally hollow cylindrical end portion which terminates at a generally annular end surface of the shell. The insulating sleeve extends through said end portion of the shell with a clearance therebetween. The end portion of the sleeve passes through said end surface of the shell. Usually, the end portion of the insulating sleeve tapers so that its diameter reduces in a direction towards the tip of the first electrode. Thus, the clearance between the end portions of the shell and the sleeve is greatest where the end portion of the sleeve passes through the end surface of the shell.

In the typical conventional spark plug described above, under normal working conditions, the spark jumps across the spark gap defined by the tips of the first and the second electrodes and goes to ground through the shell and the engine head. However, in operation, the spark plug often becomes fouled by carbon which is deposited on the portion of the insulating sleeve which is exposed to the combustion chamber. This makes the surface of the insulating sleeve conductive, creating a potential alternative path to ground avoiding the spark gap. Eventually, the resistance of the alternative path to ground becomes comparable with or less than that across the spark gap. If this occurs, the electricity ceases jumping the spark gap and "runs" along the surface of the insulating sleeve. In this case, the electricity may jump across the clearance between the end portions of the insulating sleeve and the shell, ie the spark occurs "within the plug". The spark within the plug may cause ignition of the fuel but ignition may not occur because the spark is less favourably positioned than at the spark gap as it is to some extent masked by the end portions of the shell and the sleeve. The further that the spark occurs from the end surface of the shell, the greater the masking is. A spark jumping said clearance does have the beneficial effect of burning the carbon deposit off the surface of the sleeve, thereby increasing the electrical resistance and increasing the chance of the next spark occurring at the spark gap. Thus, if a spark occurs away from the spark gap, it is not desirable but may result in ignition and tends to return the plug to normal operation. However, if the electricity runs along the surface of the sleeve all the way to the sleeve's junction with the shell, no spark occurs and ignition is impossible. Furthermore, this situation is likely to be sustained. These factors lead make it desirable that a plug has a long length of exposed insulating sleeve and that the firing end of the plug operates at high temperature in order to assist in cleaning carbon off the insulating sleeve. These considerations limit the range of applications for a particular plug, complicate manufacture, and reduce the durability of the plug.

In the known spark plugs described as being of "the closed bore type", one of which is illustrated in FIGS. 4A to 4C and others are disclosed in U.S. Pat. Nos. 4,209,990 and 5,244,188, in order to ensure that the electricity does jump to form a spark, the shell of the plug is provided with an internal flange in the region of its end surface. This flange reduces the clearance between the shell and the sleeve (typically to about 0.5 mm). The flange acts to shield the end portion of the sleeve within the shell against receiving carbon deposits and also provides a small gap (a "secondary spark gap") for the electricity to jump to the flange where it is only masked from the fuel mixture to a limited extent. In some cases, the length of the path along the surface of the sleeve is increased by providing undulations in the external surface of the insulating sleeve on the portion thereof which is within the shell (see FIG. 3 of U.S. Pat. No. 4,289,990). However, the provision of a flange on the shell does not eliminate the masking of the spark since the spark may jump to any point of the flange, including the inner face thereof. Furthermore, the provision of a flange on the shell shortens the distance from the tip of the first electrode to the shell, and, by reducing the clearance, reduces the electrical resistance in the region of the flange. Both these factors increase the chance that sparking away from the intended spark gap will occur. In addition, the flange greatly restricts access to a volume within the plug in which unburned hydrocarbons and fuel droplets may collect and possibly bridge the secondary spark gap which would render the plug inoperative.

Another approach is to provide one or more additional electrodes on the shell of the plug. Three known designs are shown in FIGS. 5A and B, FIGS. 5c and D, and in FIG. 5E, respectively. The additional electrodes provide secondary spark gaps at relatively unmasked locations. However, such electrodes are difficult and expensive to provide, only cause cleaning of the shell opposite the additional electrode so that carbon deposits can build up elsewhere, and limit the width of the intended spark gap, as it is necessary to avoid the additional electrode becoming the primary path for the electricity which may occur especially as the plug wears.

It is an object of the present invention to provide an improved spark plug in which the chance of the spark occurring away from the intended spark gap is reduced without reducing the chance of no spark occurring.

The invention provides spark plug comprising an electrically-insulating sleeve extending along a central axis of the plug, a first electrode mounted within the sleeve and having a tip projecting axially beyond an end portion of said sleeve, an electrically-conducting shell surrounding said sleeve, and a second electrode mounted on and electrically-connected to said shell, the second electrode having a tip positioned so that with the tip of said first electrode it defines a spark gap of the plug, the shell having an end portion terminating at an end surface of the shell, the sleeve extending past said end portion of the shell with a clearance therebetween and extending beyond said end surface of the shell, characterised in that the plug also comprises at least one projection formed from insulating material, the projection being positioned on the sleeve and projecting from the sleeve so that it reduces said clearance in the region of the end surface of the shell thereby forming a secondary spark gap.

In a spark plug according to the invention, the shell is not altered, thereby avoiding reducing the electrical resistance, avoiding reducing the distance to the tip of the first electrode, and simplifying manufacture, but the sparks which occur away from the spark gap are encouraged to occur between the projection and the end surface region of the shell which is the least masked position. A spark plug according to the invention gives improved cold foul resistance without requiring the plug to operate at a higher temperature during normal operation. This gives the advantages that the plug has greater durability, that it can be more easily manufactured, that the plug can have an increased safety margin during operation, and that one design of plug can be used for an increased range of operating conditions.

In a spark plug according to the invention, the projection may be integral with the sleeve or may be secured to the sleeve, being either a coating deposited on the sleeve or a separate piece attached to the sleeve. Where the projection is not integral with the sleeve, it may be formed from a different insulating material to the sleeve.

The projection may extend as an annular rib around the sleeve. This gives the advantages of increasing the length of the path to ground along the surface of the sleeve and of partially shielding the portion of the end portion of the sleeve which is within the shell from carbon deposits. Alternatively, there may be a series of projections distributed around the external surface of the sleeve. Each projection may have a domed shape in cross-section axially of the plug or may have a pointed crest. Preferably, each projection is aligned so that its crest is at least approximately co-planar with the end surface of the shell. The portion of the end portion of the sleeve which is within the shell may be provided with path-lengthening undulations.

Normally, the secondary spark plug will be wider than the intended spark gap, when the plug is new. The actual width of the secondary gap depends on the intended use but 0.5 to 1.1 mm is preferred.

There now follow detailed descriptions to be read with the accompanying drawings of some known spark plugs and of spark plugs which are illustrative of the invention

IN THE DRAWINGS

Figure 1A:
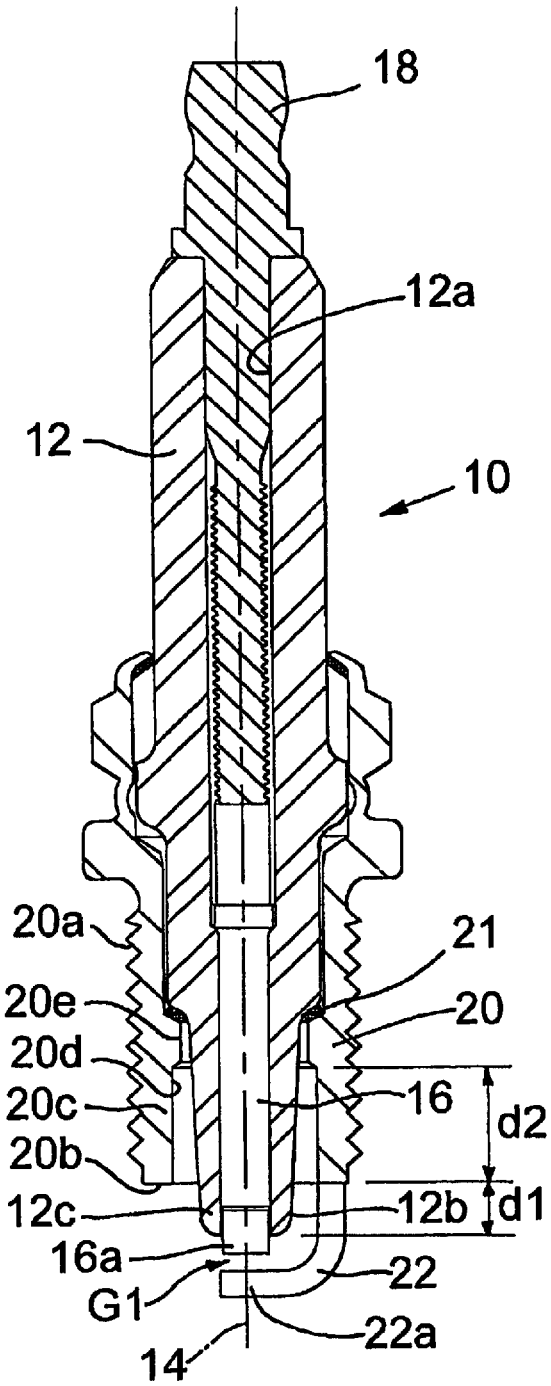
FIG. 1A is a longitudinal cross-sectional view taken through a known spark plug.

The known spark plug 10 shown in FIG. 1A comprises an electrically-insulating sleeve 12 extending along a central axis 14 of the plug 10. The sleeve 12, which is formed from alumina, defines a space 12a extending along the axis 14. The plug 10 also comprises a first electrode 16 mounted within the space 12a and having a tip 16a projecting beyond said sleeve 12. The plug 10 also comprises a terminal 18 mounted within the space 12a and projecting beyond the sleeve 12 at the other end thereof to the tip 16a of the electrode 16. Within the space 12a, the electrode 16 and the terminal 18 are in electrically-conductive contact with one another.

The plug 10 also comprises an electrically-conducting shell 20 surrounding a portion of said sleeve 12, the sleeve 12 being mounted in the shell 20. The shell 20 has an external threaded portion 20a by which the plug 10 can be mounted on an engine head. The shell 20 has an end surface 20b formed on an end portion 20c of the shell 20, which is generally annular. The end surface 20b extends radially of the axis 14. The end portion 20c is generally in the form of a hollow cylinder, having an internal surface 20d. The end portion 20c extends over an axial distance designated "d2" from the surface 20b to an inwardly-projecting flange 20e of the shell 20. The flange 20e projects into close proximity to the external surface 12b of an end portion 12c of the sleeve 12. A seal 21 seals the gap between the flange 20e and the sleeve 12. Between the flange 20e and the end surface 20b of the shell 20, there is a clearance between the internal surface 20d of the end portion 20c of the shell 20 and the external surface 12b of the end portion 12c of the sleeve 12. The external surface 12b is generally frusto-conical so that the clearance increases in width in the direction towards the tip 16a. The end portion 12c extends past the end portion 20c of the shell 20 with a clearance therebetween, and extends beyond the surface 20b, having passed through the surface 20b. The end portion 12c projects beyond the surface 20b by a distance designated "d1".

The plug 10 also comprises a second electrode 22 mounted on and electrically-connected to said shell 20. Specifically, the second electrode 22 is welded to the surface 20b and projects in a "J" shape to a tip 22a thereof positioned in opposed relationship with the tip 16a so that the tips 16a and 22a together define a spark gap designated "G1".

The plug 10 is mounted in an engine head by means of the threaded portion 20a of the shell 20 so that the tip 16a of the first electrode 16, the end portion of the sleeve 12 adjacent to the tip 16a, and the second electrode 22 project into a combustion chamber of the engine. When a high voltage is applied to the terminal 18, in normal operation of the plug 10, a spark is created which ignites fuel mixture in the combustion chamber. It is intended that the spark will cross the gap G1. However, in service, fouling (depositing of carbon) occurs on the end portion 12c of the insulating sleeve 12. This leads to the possibility that, instead of jumping the gap G1, the electricity may run along the surface 12b of the sleeve 12 into the clearance between the surfaces 12b and 20d. In this case, a spark may jump to the shell 20 anywhere along the distance d2. Unless the spark jumps near the surface 20b, the spark is at least to some extent masked from the fuel mixture by the shell 20 and the sleeve 12, making ignition uncertain. Indeed, it is possible for the electricity to travel along the end portion 12c all the way to the flange 20e and no spark may occur. To reduce this possibility, it is desirable if the distance d1 and d2 are made relatively long, d1 to discourage sparking away from the gap G1, and both d1 and d2 to reduce the possibility of no spark occurring. However, in practice, d1 is usually determined by other considerations so that the clearance between the surfaces 12b and 20d may have to be increased instead.

Figure 1B:
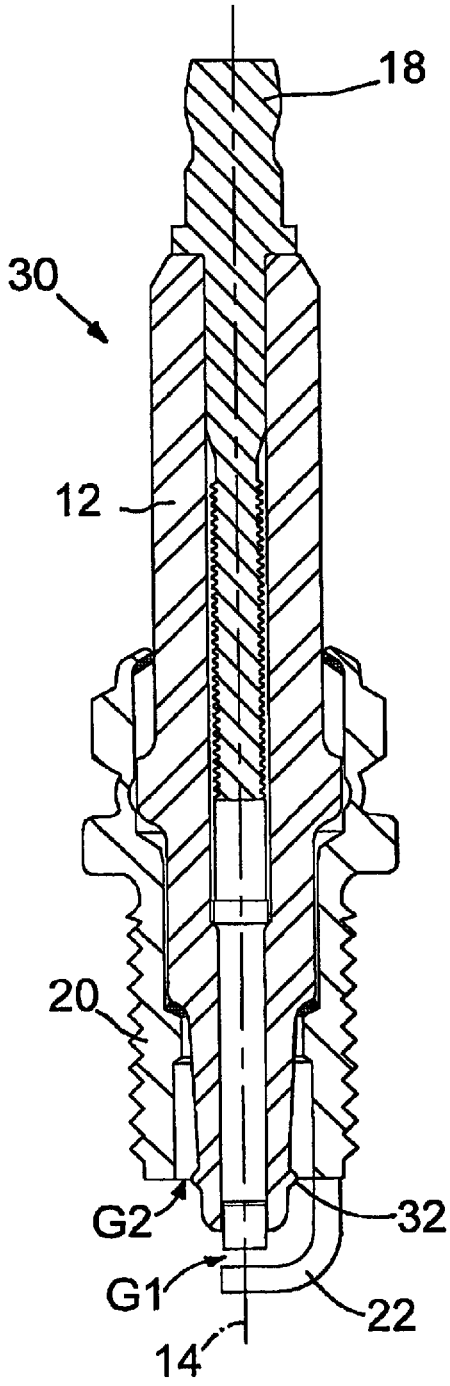
FIG. 1B is a similar view to FIG. 1A but showing a first illustrative spark plug according to the invention.
Figure 2B:
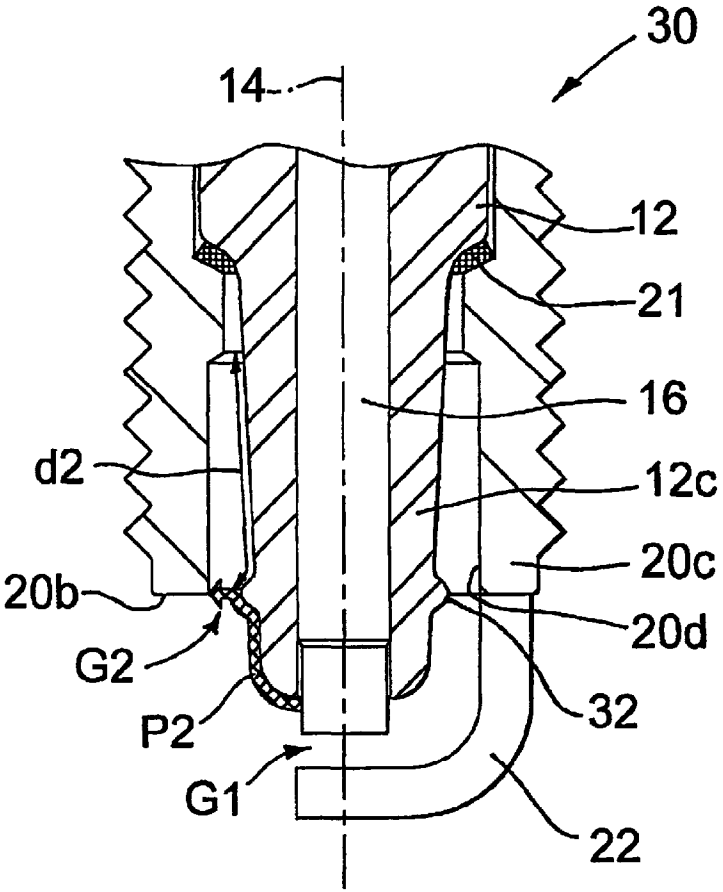
FIGS. 2A and 2B are enlarged views of portions of FIGS. 1A and 1B, respectively.

The first illustrative spark plug 30 according to the invention is illustrated in FIGS. 1B and 2B. The plug 30 differs from the plug 10 described above only in the form of its insulating sleeve so that the same reference numerals are used in relation to the parts of the plug 30 as have been used in relation to the like parts of the plug 10 without repeating the descriptions thereof. The insulating sleeve 12 of the plug 30 is also identical to the sleeve 12 of the plug 10 except that the end portion 12c thereof is provided with a projection 32. This projection 32 is integral with the sleeve 12 and projects from the end portion 12c so that, in the region of the end surface 20b of the shell 20, it reduces the clearance between the end portion 12c and the end portion 20c of the shell 20 to a gap which is designated "G2" since it provides a secondary spark gap where sparks are most likely to jump if they do not jump at the intended gap G1. The projection 32 extends as an annular rib around the sleeve 12 so that the clearance between the projection 32 and the surface 20d is substantially equal around the sleeve 12, being 0.8 mm.

In cross-section, axially of the plug 30, the projection 32 has a domed sinusoidal shape with the crest of the dome substantially co-planar with the surface 20b. In other words, the projection 32 is aligned with its centre line co-planar with the end surface 20b of the sleeve 20.

Figure 2A:
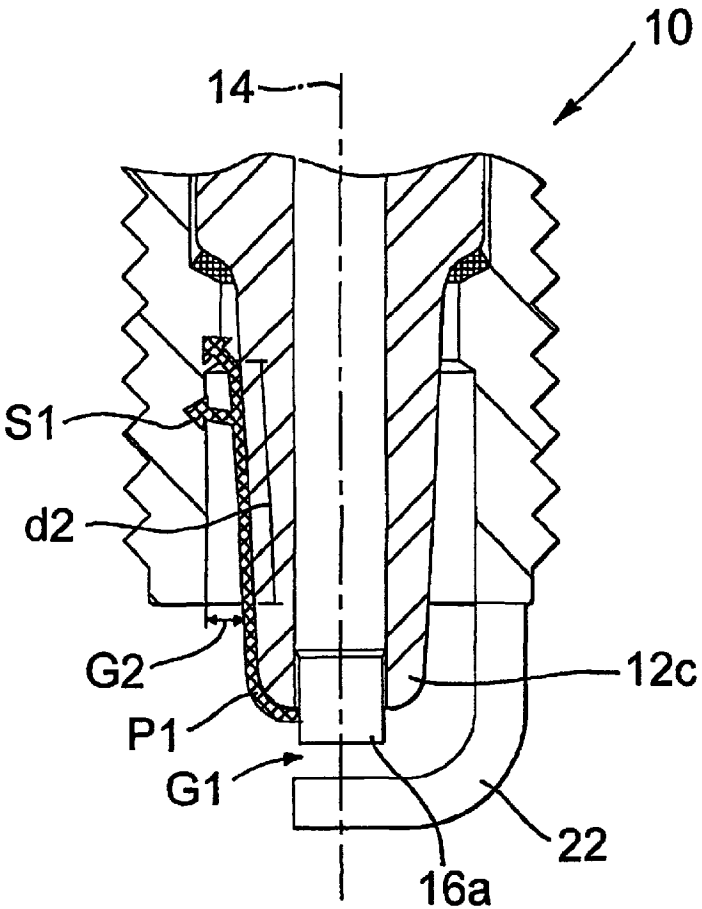

In FIGS. 1A and 2A and in FIGS. 1B and 2B, respectively, the distances d1 and d2 of the plugs 10 and 30 are shown as equal, for comparison purposes but, in practice, the distances d1 and d2 of the plug 30 can be reduced compared with those of the plug 10 for the same operating conditions.

The plug 30 operates, in normal conditions, in the same way as the plug 10, ie the spark occurs at the gap G1. However, in the event of fouling the projection 32 changes the situation. In FIG. 2A, the line P1 shows a possible alternative path for the electricity to travel to the shell 20 from the tip 16a. The arrow S1 illustrates one possible position for a spark to form but a spark may form anywhere along the distance d2 as previously described. In contrast, in FIG. 2B, the line P2 shows the probable alternative path for the electricity. It is unlikely that the electricity will pass the projection 32 so that the probability is that a spark will occur across the gap G2.

Figure 3:
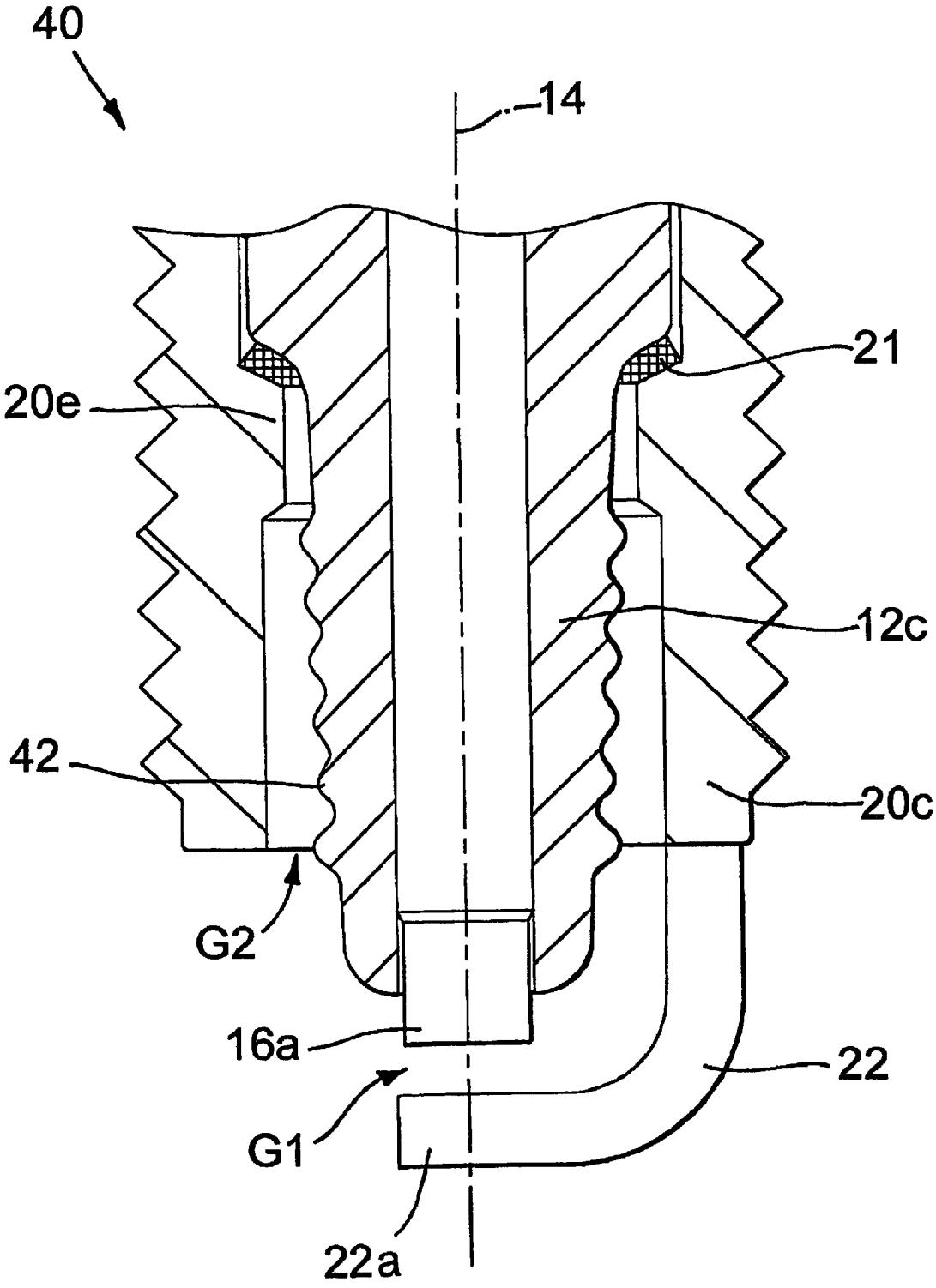
FIG. 3 is a similar view to FIG. 2B but of a second illustrative spark plug according to the invention.

In FIG. 3, there is shown the second illustrative spark plug 40 according to the invention. The plug 40 differs from the plug 30 only in that the portion of the end portion 12c of the sleeve 12 which is within the shell 20 is provided with path-lengthening undulations 42 which are in the form of annular ribs. These undulations 42 are integral with the remainder of the sleeve 12 and make it even more likely that a spark will occur at the gap G2 rather than the electricity will travel to the flange 20e without a spark forming.

Figure 4A:
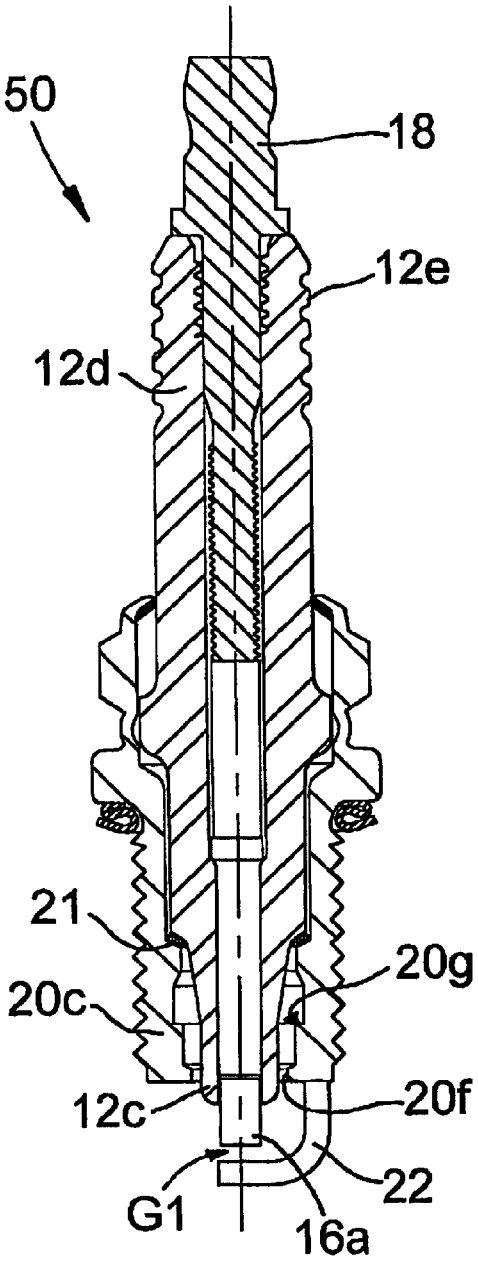
FIG. 4A is a similar view to FIG. 1 but shows a further known spark plug.
Figure 4B:
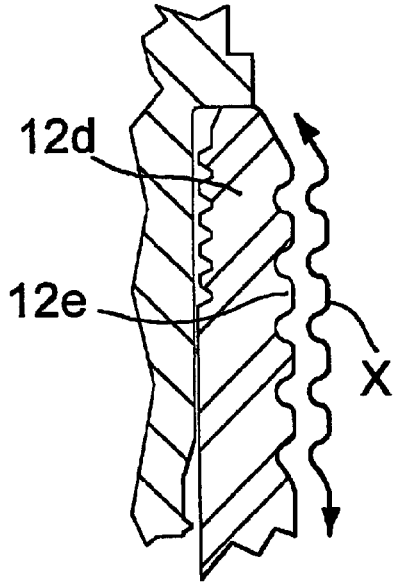
FIGS. 4B and 4C are enlarged views of portions of FIG. 4A.
Figure 4C:
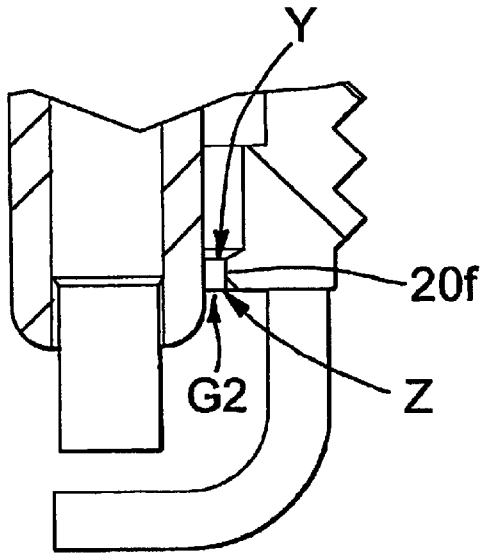

FIGS. 4A, 4B and 4C illustrate a further known spark plug 50. The spark plug 50 differs from the plug 10 only in the respects mentioned below so that the same reference numerals are used in relation to the parts in the plug 50 as have been used in relation to the plug 10 without repeating the descriptions thereof. The plug 50 differs from the plug 10 in that the end portion 20c of the shell 20 thereof has a different shape, in that the end portion 12c of the sleeve 12 thereof has a different shape, and in that the portion 12d of the sleeve 12 thereof which is adjacent to the terminal 18 has a different shape.

Specifically, the end portion 20c of the shell 20 is provided with an internal flange 20f which extends from the end surface 20b, and also has a step 20g therein. The shape of the end portion 12c is generally cylindrical between its end adjacent to its tip 16a and the step 20g and then tapers outwardly in a frusto-conical shape to the seal 21. The portion 12d is provided with path-lengthening undulations 12e which reduce the possibility of a short circuit on the length X between the terminal 18 and the shell 20.

In the operation of the plug 50, in normal conditions, the spark occurs at the gap G1. However, in the event of fouling on the sleeve 12, the electricity may run along the surface of the sleeve and jump to the flange 20f which thereby provides a secondary spark gap G2. However, the gap G2 has a considerable axial length between the points Y and Z shown in FIG. 4C and the spark may occur anywhere along this distance. Furthermore, the flange 20f approaches the tip 16a closer than the remainder of the shell, thereby increasing the possibility of sparking at the gap G2 in preference to the gap G1.

Figure 5A:
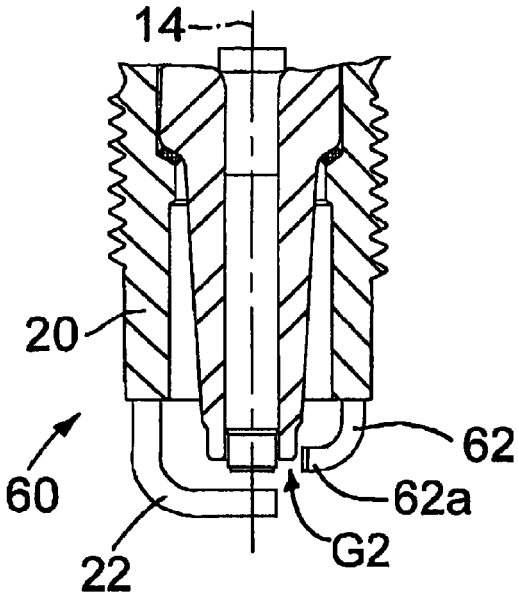
FIG. 5A is a view similar to FIG. 3 but of a further known spark plug.
Figure 5C:
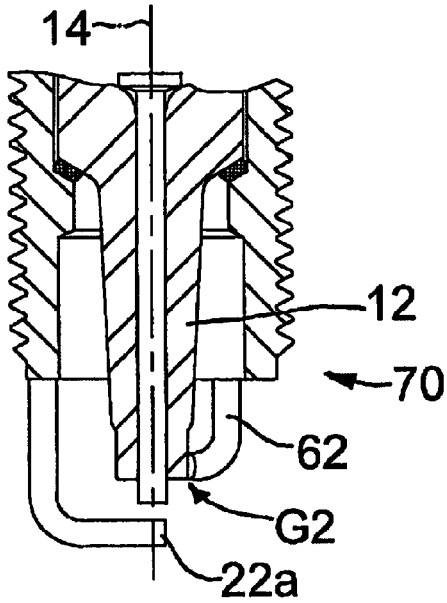
FIGS. 5C and 5D are similar views to FIGS. 5A and 5B but of a further known spark plug.
Figure 5B:
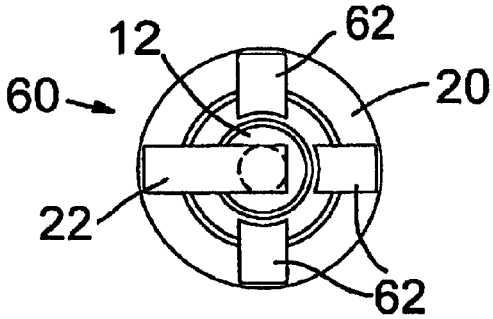
FIG. 5B is an end view of the plug shown in FIG. 5A.

FIGS. 5A and 5B, FIGS. 5C and 5D, and FIG. 5E show, respectively, three known designs of plugs which are provided with one or more additional electrodes. The same reference numerals are again used for like parts as are used in relation to the plug 10 without repeating the description thereof. In FIGS. 5A and 5B, a plug 60 is shown which has three additional electrodes 62 which are all welded to the shell 20 and, including the second electrode 22, the four electrodes are evenly distributed about the axis 14. The electrodes 62 are arranged so that the project to tips 62a which are further from the tips 16a than the tip 22a of the second electrode 22. Specifically, the electrodes 62 extend to points which are in opposed relationship with the end of the sleeve 12. In the operation of the plug 60, the three electrodes 62 provide three alternative secondary spark gaps G2 which come in to operation in the event of fouling, when the electricity runs over the end of the sleeve 12 and jumps to the electrode 62.

Figure 5D:
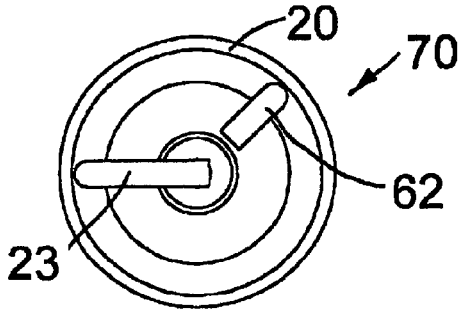

FIGS. 5C and 5D show a known plug 70 which is similar to the plug 60 but is provided with only one additional electrode 62 which has its tip in opposed relationship with the side surface of the end of the sleeve 12.

Figure 5E:
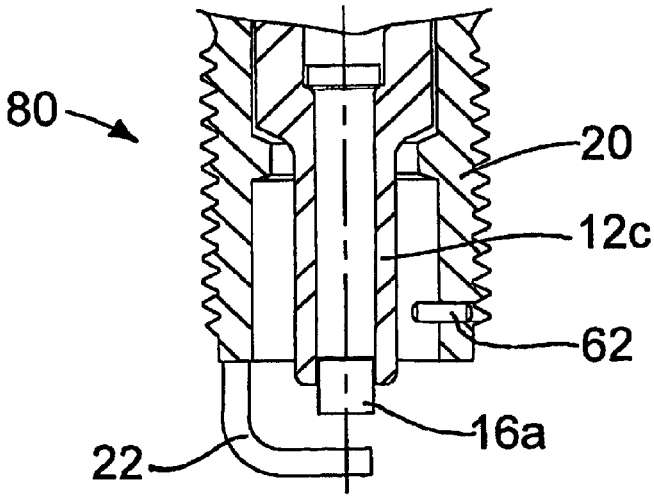
FIG. 5E is a view similar to FIGS. 5A and 5C but of a further known spark plug.

FIG. 5E illustrates a known plug 80 which is similar to the plugs 60 and 70 but has its additional electrode 62 provided by a pin mounted on the shell 20 and projecting inwardly towards the surface of the end portion 12c which is cylindrical.

Figure 6A:
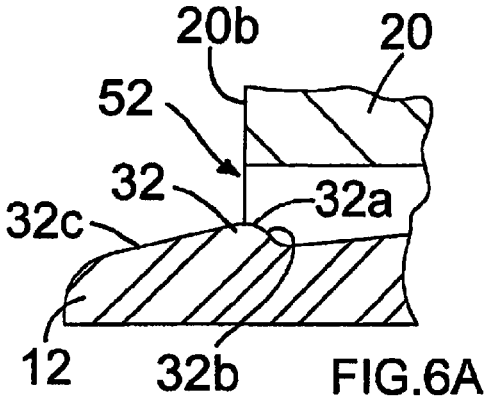
FIG. 6A to FIG. 6G are enlarged views of alternative projections which may be used in spark plugs according to the invention.
Figure 6B:
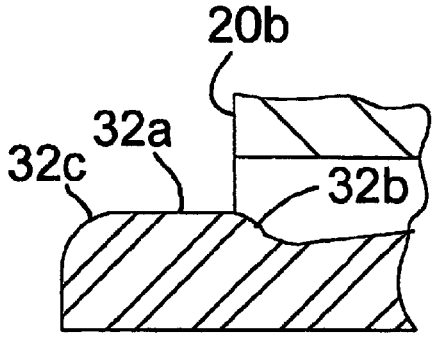
Figure 6C:
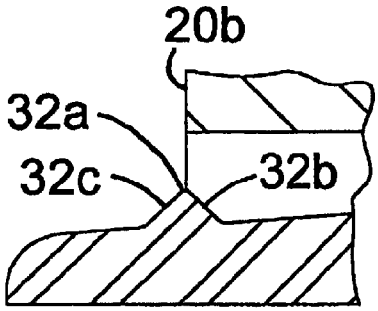
Figure 6D:
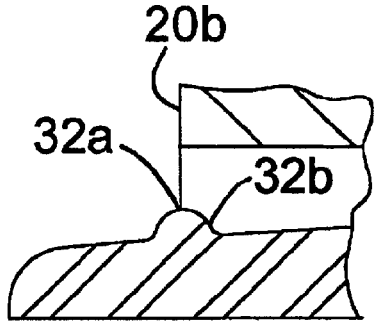
Figure 6E:
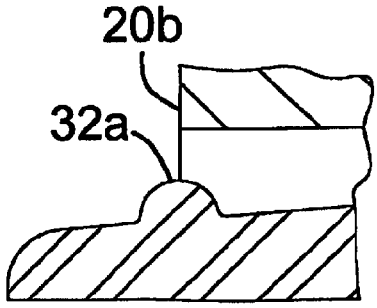
Figure 6F:
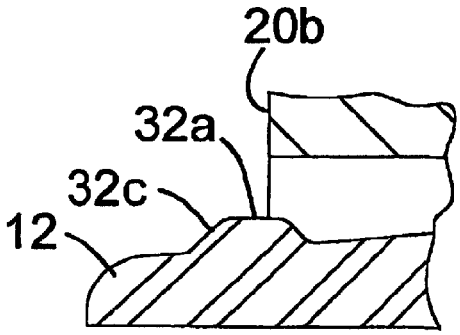
Figure 6G:
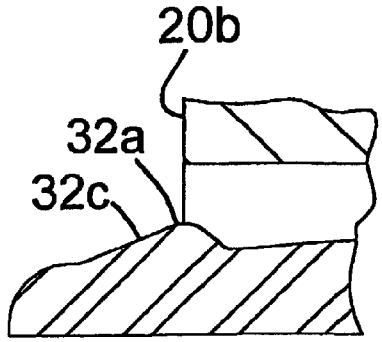

FIG. 6A to 6G show alternative forms for the projection 32 which may be used instead of the projection illustrated in FIGS. 1B and 2B or instead of the projection 32 illustrated in FIG. 3. In FIG. 6A, the projection 32 is asymmetrical having a crest 32a which is co-planar with the surface 20b, an inner (furthest from the tip 16a) side surface 32b which is approximately sinusoidal, and an outer (nearest to the tip 16a) side surface 32c which is inclined at a constant angle to the axis 14 of the plug. In FIG. 6B, the projection is symmetrical having a flat crest 32a extending between two sinusoidal side surfaces 32b and 32c, the crest 32a being arranged so that most of it is outwardly positioned relative to the surface 20c but adjacent to the surface 32b extending through the surface 20b. In FIG. 6C, the projection 32 has a pointed crest 32a which is co-planar with the surface 20b and the side surfaces 32b and 32c are inclined at opposite angles relative to the axis 14 creating a symmetrical projection. In FIG. 6D, the projection 32 has the same form, ie sinusoidal, as in FIGS. 1B, 2B and 3 with its crest 32a co-planar with the surface 20b. In FIG. 6E, the projection 32 has a semi-circular form with its crest 32a co-planar with the surface 20b. In FIG. 6F, the projection 32 has a form similar to that shown in FIG. 6B but the projection does not extend as far towards the tip 16a. In FIG. 6G, the projection has a form similar to that shown in FIG. 6A but the side surface 32c is more steeply inclined.

It is preferred that the side surfaces 32b and 32c of the projection 32 should be inclined at angles up to 60 degrees relative to the axis 14. Angles above 30 degrees are preferred to reduce sparks occurring low down in the plug.

The known plugs 10 and 50 and the plug according to the invention 30 were subjected to cold foul tests. These tests involved cooling a vehicle down to minus ten degrees C., starting the engine, immediately accelerating hard through first, second and third gears up to 50 km/h, holding this speed for 2 seconds, turning off the engine, waiting for the temperature to fall again, repeating the starting, driving and cooling stages until the car will not start again or misfires such that the speed mentioned cannot be achieved. This test is designed to cause cold fouling on the plugs, without allowing the temperature to rise sufficiently for any cleaning to occur. Clearly, the more times that the test procedure can be repeated (cycles), the better is the performance of the plug. In these tests, the lug 10 achieved an average of 11.8 cycles, the plug 50 achieved an average of 9.0 cycles and the plug 30 according to the invention achieved 26.7 cycles.

The invention claimed is:

1. A spark plug comprising an electrically-insulating sleeve extending along a central axis of the plug, a first electrode mounted within the sleeve and having a tip projecting axially beyond an end portion of said sleeve, an electrically-conducting shell surrounding said sleeve, and a second electrode mounted on and electrically-connected to said shell, the second electrode having a tip positioned so that with the tip of said first electrode it defines a spark gap of the plug, the shell having an end portion terminating at an end surface of the shell, the sleeve extending past the end portion of the shell with a clearance therebetween and extending beyond said end surface of the shell, wherein the plug also comprises at least one projection formed from insulating material, the projection being positioned on the sleeve and extending circumferentially of the sleeve, the projection having a shape, in cross-section axially of the plug, such that a crest of the projection is located in the region of the end surface of the shell and reduces said clearance to lie in the range 0.5 to 1.1 mm, thereby forming a secondary spark gap[.]*; and*

*wherein the crest of the projection is bounded in the direction away from the first electrode by a projection side surface and the boundary between that crest and said projection side surface is substantially co-planar with the end surface of the shell.*

2. A spark plug according to claim 1, wherein the projection is integral with the sleeve.

3. A spark plug according to claim 1, wherein the projection extends as an annular rib around the sleeve.

4. A spark plug according to claim 1, wherein the projection has a domed shape in cross-section axially of the plug.

5. A spark plug according to claim 1, wherein the projection has at least one of its side surfaces inclined at an angle of between 60 and 30 degrees relative to the axis.

6. A spark plug according to claim 1, wherein the projection has a flat crest.

[7. A spark plug according to claim 1, wherein the crest of the projection is bounded in the direction away from the first electrode by a projection side surface and the boundary between that crest and said projection side surface is co-planar with the end surface of the shell.]

8. A spark plug according to claim 1, wherein the portion of the end portion of the sleeve which is within the shell is provided with path-lengthening undulations.

9. A spark plug according to claim 8, wherein the crest of the projection is bounded in the direction towards the first electrode by a projection side surface and the boundary between that crest and said projection side surface is co-planar with the end surface of the shell.

* * * * *